(12) United States Patent
Williams

(10) Patent No.: US 8,706,581 B2
(45) Date of Patent: Apr. 22, 2014

(54) SOFTWARE AND METHODS TO MANAGE A TAX PREPARATION COMPANY

(76) Inventor: Traci Renee Williams, Chicago, IL (US)

( * ) Notice: Subject to any disclaimer, the term of this patent is extended or adjusted under 35 U.S.C. 154(b) by 248 days.

(21) Appl. No.: 13/419,392

(22) Filed: Mar. 13, 2012

(65) Prior Publication Data

US 2013/0246234 A1    Sep. 19, 2013

(51) Int. Cl.
*G06Q 40/00* (2012.01)
(52) U.S. Cl.
CPC ..................................... *G06Q 40/123* (2013.01)
USPC ............................. 705/31; 705/19; 705/36 T
(58) Field of Classification Search
CPC .................................................... G06Q 40/123
USPC ............................................ 705/19, 31, 36 T
See application file for complete search history.

(56) References Cited

U.S. PATENT DOCUMENTS

| 2009/0177685 | A1* | 7/2009 | Ellis et al. ................. 707/103 R |
| 2010/0332362 | A1* | 12/2010 | Ramsey et al. ................. 705/31 |
| 2012/0084185 | A1* | 4/2012 | Ciaramitaro et al. ........... 705/31 |

* cited by examiner

*Primary Examiner* — Ryan Zeender
*Assistant Examiner* — Hunter Wilder

(57) ABSTRACT

A software application and related business methods enable a tax preparation business to organize and track its clientele and monetary volume without regard to business volume. In addition, the software and methods can be used to generate a commission-issued payroll with minimal management and oversight. The software and methods can work in conjunction with conventional tax preparation software by adding the missing managerial component to improve its use as it pertains to the day-to-day operations of the tax preparation business.

6 Claims, 1 Drawing Sheet

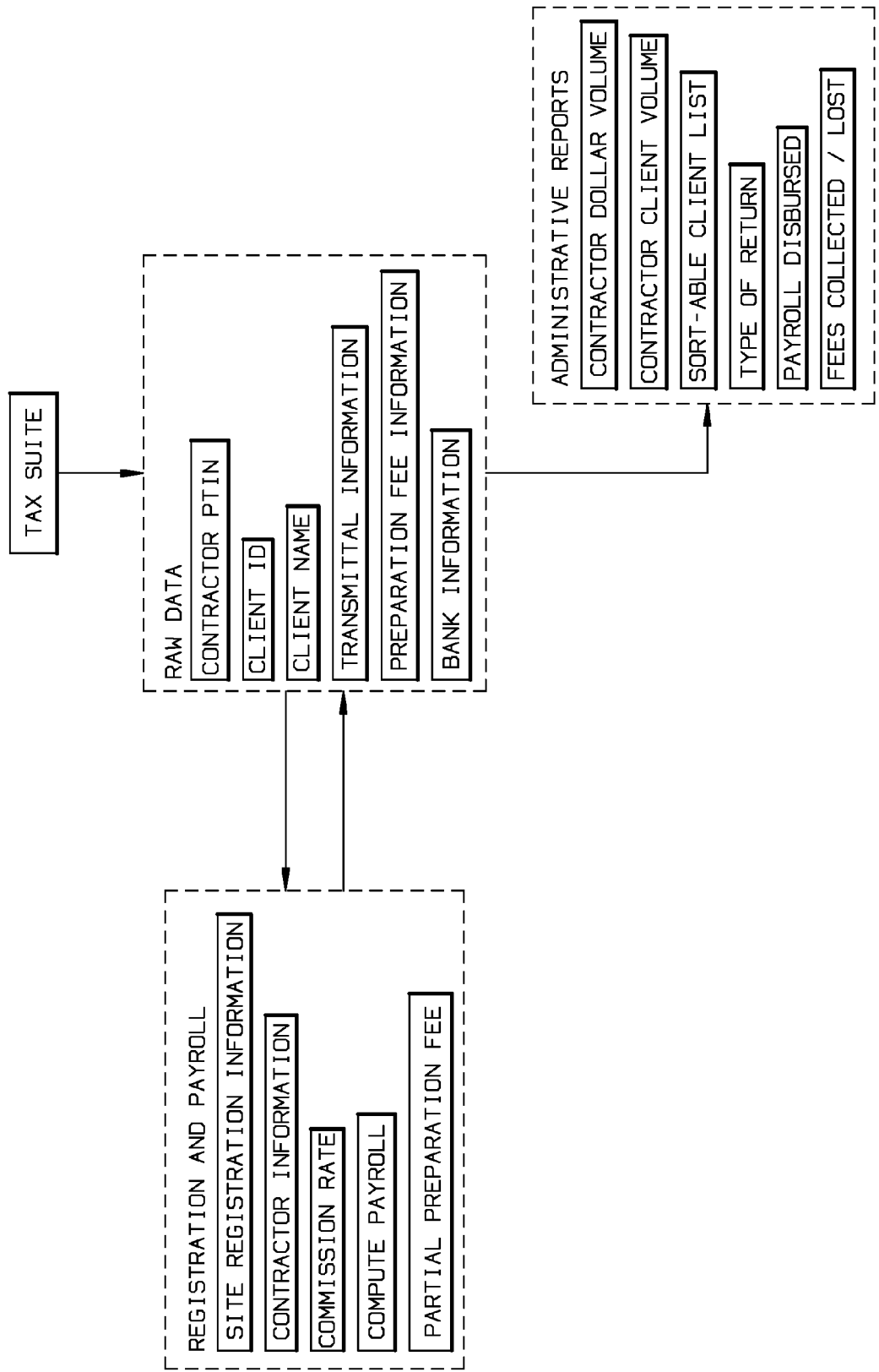

US 8,706,581 B2

SOFTWARE AND METHODS TO MANAGE A TAX PREPARATION COMPANY

BACKGROUND OF THE INVENTION

The present invention relates to software and business methods and more particularly, to software and methods used to manage the day-to-day operations within a tax preparation company.

Day-to-day operations within a tax preparation business are difficult due to a lack of automation. Tax businesses are forced to create their own little systems in effort to aid them in managing and tracking the business's clientele and monetary volume. In doing so, the management and tracking can become very time consuming and difficult, especially as the volume increases.

Conventional tax preparation software, including those most frequently used on the market, has no managerial component. Therefore, a tax professional is unable to retrieve administrative reports pertaining to client, monetary volume or quality control.

As can be seen, there is a need for an improved software application and business method for managing the day-to-day operations within a tax preparation company.

SUMMARY OF THE INVENTION

In one aspect of the present invention, a computer-implemented method, written as a programmable code, stored on a computer readable medium, and adapted to manage operations of a tax preparation business, the method comprises inputting contractor data into a software application on a computer; obtaining raw data into the software application from a tax preparation software; linking the raw data to a contractor in the database through an identification number associated with the contractor; and providing a plurality of reports for a user to select.

In another aspect of the present invention, a method for managing operations of a tax preparation business comprises entering data for each tax preparer into a software application, the data including the tax preparer's PTIN and the tax preparer's commission rate; retrieving data from a tax preparation software into the software application, the data including the tax preparer's PTIN for each client file and the preparation fee information for each client file; and tracking data for each tax preparer.

These and other features, aspects and advantages of the present invention will become better understood with reference to the following drawing, description and claims.

BRIEF DESCRIPTION OF THE DRAWINGS

The FIGURE provides an overview of the interaction between the components of a tax preparation company management software application according to an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides software and methods to enable a tax preparation business to organize and track its clientele and monetary volume without regard to business volume. In addition, the software and methods of the present invention can be used to generate a commission-issued payroll with minimal management and oversight. The software and methods of the present invention can work in conjunction with conventional tax preparation software by adding the missing managerial component to improve its use as it pertains to the day-to-day operations of the tax preparation business.

Referring now to the FIGURE, a software application may be divided into three components. These components may be integral to a single software application and are described for the sake of clarity as opposed to software design. The first component includes the start-up administrative data entry information. The second component includes the imported information from a tax preparation software application. The third component is designed to generate administrative reports from the information shared between the first and second components. Further details on these components are described in greater detail below.

The software of the present invention may be written in any one or more programming languages. In some embodiments, the software may be designed to operate on a computer system, having a central processing unit, memory and other typical computer components. In some embodiments, the software may reside on a server and operate on various computers or computer terminals. In some embodiments, the software may reside at least partially on a server or cloud-based system or on an internet-based system, where data from the tax preparation software may be interchanged with the software of the present invention. Security measures may be included with the software, such as data encryption, to permit the secure exchange of information between the tax preparation software and the software of the present invention.

The software of the present invention may include computer code, disposed on a computer readable medium, adapted to perform the various functions as described herewithin. The software of the present invention may be capable of retrieving data from the tax preparation software and transforming that data into one or more valuable reports.

The first component includes manually populated information regarding the tax contractors of the tax preparation business. This first component can serve as a hub for contractor information. In doing so, the contractor PTIN number may be used to link the contractor to client related raw data that is present in the second component. In addition, contractor payroll can be calculated in this first component using the manually inputted and client related raw data from the second component. This first component may include the contractor's commission rate.

The second component includes the raw data obtained from the tax preparation software (also referred to as "taxwise"). This second component can serve as a hub for the imported data as well as the manually inputted data from the first component. The raw data in the second component can supply all the vital data used to generate the administrative reports from the first and the third components. The second component may include information for each file, including the contractor's PTIN that worked on the file, the client identification, the client name, transmittal information, preparation fee information and bank information. Other information or less information may be imported from the tax preparation software and may be present in this second component, depending on the application and requirements of the user.

The third component includes various administrative reports that may be generated by the software of the present invention. These reports can be useful in the management of the day-to-day operations of the tax business. Exemplary reports can include a contractor dollar volume report, a contractor client volume report, a client list, a report showing the type of returns completed (with or without associated contractor information), payroll reports, and fees collected or lost reports. Other reports may be includes within the scope of the present invention, depending on the needs of the business.

In some embodiments, the software of the present invention may be adapted as a "plug-in" for a conventional tax preparation software package, adding managerial usefulness to the tax preparation software package. In some embodiments, the software may be a separate, stand-alone software, designed to interface with the tax preparation software as needed to gather data needed for report and payroll generation.

It should be understood, of course, that the foregoing relates to exemplary embodiments of the invention and that modifications may be made without departing from the spirit and scope of the invention as set forth in the following claims.

What is claimed is:

1. A computer-implemented method, written as a programmable code, stored on a non-transitory computer readable medium, and adapted to manage operations of a tax preparation business, the method comprising:
   inputting contractor data into a software application stored on a database in a computer, wherein the contractor data includes Preparer Tax Identification Numbers (PTINs) and commission rates for a plurality of contractors;
   obtaining raw data into the software application from a tax preparation software, wherein the raw data includes at least a PTIN for at least one of the plurality of contractors;
   linking the raw data to the contractor data using PTIN for the least one of the plurality of contractors; and
   providing a plurality of reports for a user to select based on the linked raw data and contractor data, wherein the plurality of reports include a contractor dollar volume report, a contractor client volume report, a client list, a type of return report, a payroll report and a fees collected/lost report.

2. The method of claim 1, further comprising generating one of the plurality of reports.

3. The method of claim 1, wherein the raw data further includes a client identification, a contractor PTIN for each of a plurality of client files, a client name, transmittal information, preparation fee information and bank information.

4. A method for managing operations of a tax preparation business, the method comprising:
   entering contractor data for each of a plurality of tax preparers into a software application, stored in a database on a computer, the data including each of the plurality of tax prepares' Prepare Tax Identification Numbers (PTINs) and each of the plurality of tax prepares' commission rates;
   retrieving raw data from a tax preparation software into the software application, the raw data including at least one of the plurality of tax prepares' PTINs for each of a plurality of clients files and preparation fee information for each of the plurality of client files;
   linking the raw data to the contractor data using the PTIN for at least one of the plurality of contractors;
   tracking linked data for each of the plurality of tax preparers; and
   providing one or more reports based on the tracked linked data, wherein the one or more reports include a contractor dollar volume report, a contractor client volume report, a client list, a type of return, a payroll report and a fees collected/lost report.

5. The method of claim 4, further comprising generating one of the one or more reports.

6. The method of claim 4, wherein the step of tracking linked data for each of the plurality of tax preparers includes tracking productivity data and financial data.

* * * * *